(12) United States Patent
Kosaka et al.

(10) Patent No.: US 11,232,192 B2
(45) Date of Patent: Jan. 25, 2022

(54) AUTOMATIC DEPLOYMENT OF APPLICATION SECURITY POLICY USING APPLICATION MANIFEST AND DYNAMIC PROCESS ANALYSIS IN A CONTAINERIZATION ENVIRONMENT

(71) Applicant: NeuVector, Inc., San Jose, CA (US)

(72) Inventors: Glen K. Kosaka, Mountain View, CA (US); Gang Duan, San Jose, CA (US); Fei Huang, Fremont, CA (US)

(73) Assignee: NeuVector, Inc., San Jose, CA (US)

( * ) Notice: Subject to any disclaimer, the term of this patent is extended or adjusted under 35 U.S.C. 154(b) by 485 days.

(21) Appl. No.: 16/238,524

(22) Filed: Jan. 3, 2019

(65) Prior Publication Data

US 2020/0218798 A1 Jul. 9, 2020

(51) Int. Cl.
*G06F 21/53* (2013.01)
*G06F 9/451* (2018.01)
*G06F 9/455* (2018.01)

(52) U.S. Cl.
CPC .............. *G06F 21/53* (2013.01); *G06F 9/451* (2018.02); *G06F 9/455* (2013.01); *G06F 9/45541* (2013.01); *G06F 9/45558* (2013.01); *G06F 2009/45562* (2013.01); *G06F 2009/45587* (2013.01); *G06F 2221/033* (2013.01)

(58) Field of Classification Search
CPC ....... G06F 9/45558; G06F 2009/45562; G06F 9/455; G06F 2009/45587; G06F 2221/033; G06F 21/53; G06F 9/451; G06F 21/629; G06F 9/45541
See application file for complete search history.

(56) References Cited

U.S. PATENT DOCUMENTS

| | | | | |
|---|---|---|---|---|
| 2009/0271472 | A1* | 10/2009 | Scheitler | G06F 9/485 709/202 |
| 2016/0092251 | A1* | 3/2016 | Wagner | H04L 41/06 718/1 |
| 2016/0359955 | A1* | 12/2016 | Gill | H04L 67/10 |
| 2017/0063722 | A1* | 3/2017 | Cropper | H04L 47/823 |
| 2017/0093921 | A1* | 3/2017 | Duan | H04L 45/306 |
| 2018/0144123 | A1* | 5/2018 | Levin | G06F 21/52 |
| 2018/0278639 | A1* | 9/2018 | Bernstein | G06F 21/577 |
| 2019/0081955 | A1* | 3/2019 | Chugtu | H04L 63/0236 |
| 2019/0236370 | A1* | 8/2019 | Man | G05B 19/41875 |

* cited by examiner

*Primary Examiner* — Tuan C Dao
(74) *Attorney, Agent, or Firm* — Fenwick & West LLP

(57) ABSTRACT

A policy interpreter detects that an application container has been added in a container system, and opens a stored manifest for the application container. The policy interpreter retrieves running services information regarding the application container, and generates a security policy for the application container. The security policy defines a set of actions for which the application container can perform, and the set of actions are determined using the manifest and the running service information associated with the application container. The policy interpreter loads the security policy at a security container. The security container blocks an action performed by the application container in response to determining that the action performed by the application container does not match any action in the set of actions defined in the security policy. The policy interpreter transmits the security policy to a graphical user interface container for presentation to a user via a display device.

18 Claims, 9 Drawing Sheets

```
version: '2'
services:
  db:
    image: mysql:5.7
    container_name: mysql
    labels:
      nv.service.name: "Database"
      nv.service.type: "data"
    volumes:
      - "./.data/db:/var/lib/mysql"
    restart: unless-stopped
    environment:
      MYSQL_ROOT_PASSWORD: wordpress
      MYSQL_DATABASE: wordpress
      MYSQL_USER: wordpress
      MYSQL_PASSWORD: wordpress
  wordpress:
    depends_on:
      - db
    image: wordpress:latest
    container_name: wordpress
    labels:
      nv.service.name: "WordpressNV"
      nv.service.type: "website"
    links:
      - db:mysql
    ports:
      - "2080:80"
    restart: unless-stopped
    environment:
      WORDPRESS_DB_HOST: db:3306
      WORDPRESS_DB_PASSWORD: wordpress
```

FIG. 2A

```
$kubectl describe service -n demo

Name:                       nginx-webui
Namespace:                  demo
Labels:                     <none>
Annotations:                <none>
Selector:                   app=nginx-pod
Type:                       LoadBalancer
IP:                         10.100.116.153
LoadBalancer Ingress:       a191ca9dac32e11e8ae1b06da680f7e4-1375868572.us-west-2.elb.amazonaws.com
Port:                       webui  80/TCP
TargetPort:                 80/TCP
NodePort:                   webui  30885/TCP
Endpoints:                  172.31.0.136:80
Session Affinity:           None
External Traffic Policy:    Cluster
Events:                     <none>

Name:                       node
Namespace:                  demo
Labels:                     <none>
Annotations:                <none>
Selector:                   app=node-pod
Type:                       ClusterIP
IP:                         None
Port:                       cluster-tcp-8888  8888/TCP
TargetPort:                 8888/TCP
Endpoints:                  172.31.14.106:8888,172.31.2.94:8888,172.31.7.152:8888
Session Affinity:           None
Events:                     <none>

Name:                       redis
Namespace:                  demo
Labels:                     <none>
Annotations:                <none>
Selector:                   app=redis-pod
Type:                       ClusterIP
IP:                         None
Port:                       cluster-tcp-6379  6379/TCP
TargetPort:                 6379/TCP
Endpoints:                  172.31.0.238:6379
Session Affinity:           None
Events:                     <none>
```

FIG. 2B

```
kind: NetworkPolicy
apiVersion: networking.k8s.io/v1
metadata:
  name: node-allow
spec:
  podSelector:
    matchLabels:
      app: node-pod
  ingress:
  - ports:
    - port: 8888
    from:
    - podSelector:
        matchLabels:
          app: nginx-pod
  egress:
  - ports:
    - port: 6379
    to:
    - podSelector:
        matchLabels:
          app: redis-pod
```

FIG. 2C

AUTOMATIC DEPLOYMENT OF APPLICATION SECURITY POLICY USING APPLICATION MANIFEST AND DYNAMIC PROCESS ANALYSIS IN A CONTAINERIZATION ENVIRONMENT

FIELD OF ART

The disclosure generally relates to the field of containerization security, and specifically to automatic deployment of application security policy using application manifest and dynamic process analysis in a containerization environment.

BACKGROUND

A recent development in networked infrastructure is the container model. In the container model, a kernel of an operating system (e.g., Linux) allows for multiple isolated user-space instances, or "containers," executing simultaneously. Each container is isolated from other containers, and may access a set of resources that are isolated from other containers. Each container also interacts with a container service, which may provide various functions, such as an application programming interface (API) to allow each container to access various functions of the container service (e.g., establishing communications, communicating with other containers, logging). One advantage of such a container system is the ability of the container system, with the assistance of the container service, to quickly and transparently migrate containers between hosts during live operation, e.g., for load balancing. Another advantage is that, since virtual emulation of resources, such as in a virtual machine (VM) environment, is not being performed to provide resources to the containers, the overhead compared to a VM-based environment is much lower.

However, within such container systems, security and threat detection can be a more challenging issue. A container system includes many different components, in many cases more than a traditional system. The container system has a host operating system, a container service, multiple application containers with their own configuration, with each application container accessing various resources, such as with network connections other containers and to the Internet. Such a complex system has a broad surface area for malicious attackers to penetrate. In particular, many thousands or millions of application containers may be removed and added to the system daily as customers of the system add and remove services. Each of the application containers may be designed to perform certain functions, and thus execute instructions that are typically limited to a certain pattern. For example, an application container executing the functions of a web server would listen to HTTP requests, but would probably not be listening to VPN connection requests. These functions may however be obscured from a system administrator, as each customer may independently deploy their application container, which contains (potentially obfuscated) binary executable code which cannot feasibly be analyzed by a human for functions. Due to the high volume of application containers being added and removed from the system, and the non-transparent nature of the application containers, monitoring for security risks amongst the application containers is a challenge. Therefore, what is lacking, inter alia, is a system of determining a security policy of application containers that are added to a container system.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 2A is an example of manifest data of an application container deployment configuration information for two application containers, according to an example embodiment.

FIG. 2B is an example of dynamic running services information, according to an example embodiment.

FIG. 2C is another example of dynamic running services information, according to an example embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed is an operating system virtualization system (container system) configured to detect that an application container has been added in the container system, the application container having computer-readable instructions, with the application container added via a container service and isolated using operating system-level virtualization. The container system opens a stored manifest for the application container, with the manifest comprising configuration settings for the newly added application container.

The container system retrieves running services information regarding the application container, with the running services information including information provided by the container service about the application container running on the container system.

The container system generates a security policy for the application container, with the security policy defining a set of actions for which the application container can perform. The set of actions are determined using the manifest and the running service information associated with the application container.

The container system loads the security policy at a security container, with the security container configured to, upon loading the security policy, block an action performed by the application container in response to determining that the action performed by the application container does not match any action in the set of actions defined in the security policy for the application container.

The container system transmits the security policy to a graphical user interface container for presentation to a user via a display device, with the graphical user interface container presenting information about the generated security policy.

Example System with Policy Interpreter

Figure 1:
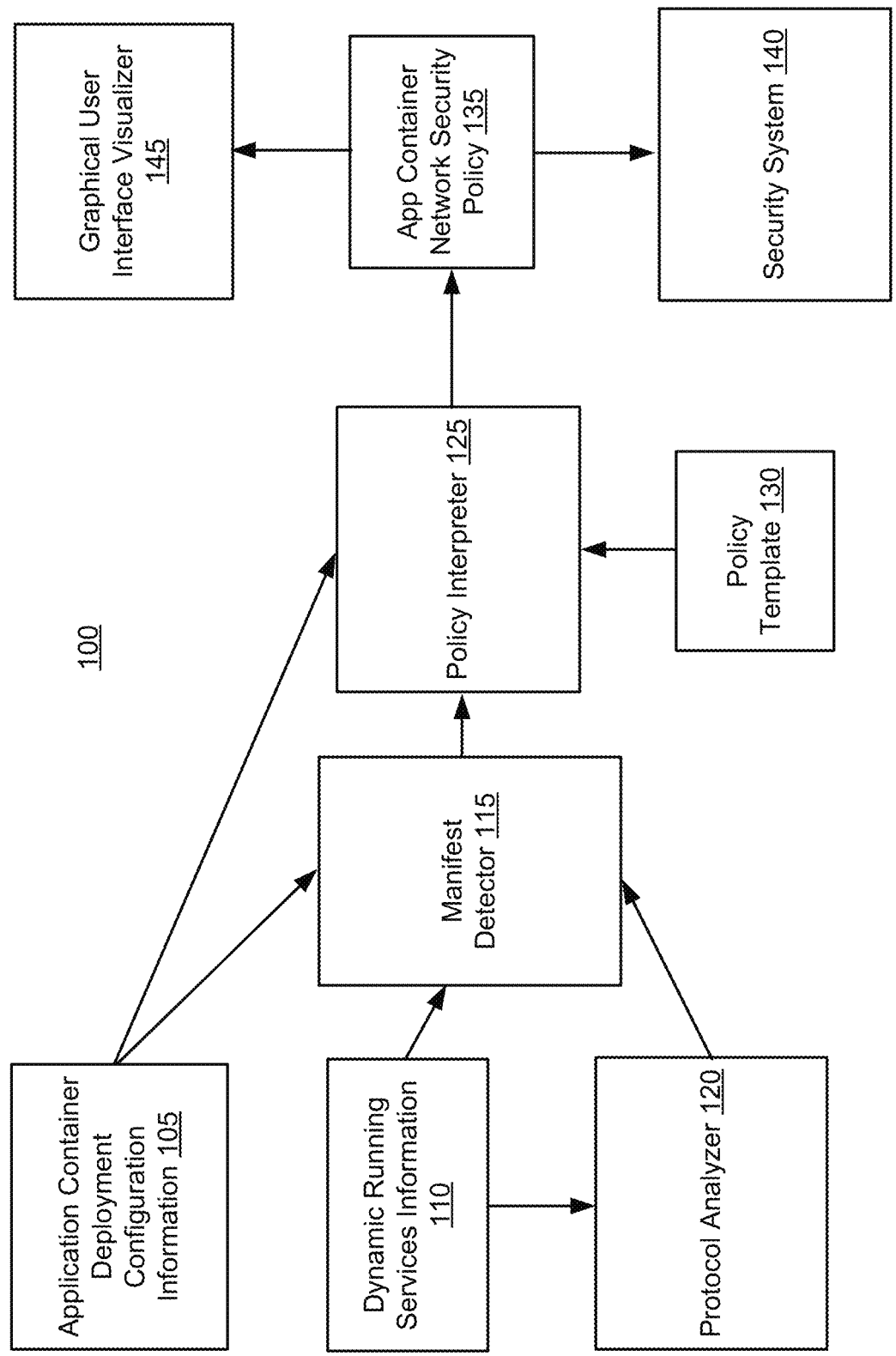
FIG. 1 illustrates a system with a policy interpreter to automatically generate security policies for application containers in a container environment, according to an example embodiment.

Turning now to FIG. 1 (FIG. 1) it illustrates a system 100 with a policy interpreter to automatically generate security policies for application containers in a container environment, according to an example embodiment.

In one embodiment, the system 100 described herein is used for the security analysis of application containers. An application container is an instance of a user-space process executing on a resource isolated instance within an OS. The application containers execute in an operating system (OS) level virtualization environment whereby the application containers execute on a shared set of resources of a host. Each container has access to a set of isolated resources, but does not have direct access to the actual physical resources of the underlying hardware of the host. These physical resources may include a CPU, I/O devices, network devices, memory, physical storage, and so on. The isolated resources are not emulated, as would be the case with resources within a virtual machine, but are rather presented to the app container as a portion of the physical resources, with the remainder of the physical resources hidden from the app container. Additional details of components that may be used in such a container system are described with further detail below with regards to FIG. 4.

A challenge in such a container system is an increase in complexity due to the number of components compared to traditional systems (e.g., one in which applications run without a container service and without resource isolation). In one particular instance, the container system may allow multiple customers to each independently deploy a large number of application containers. Each application container exhibits a certain behavior. This behavior may include the performance of a variety of actions. These actions are in turn not previously known to an administrator or security system for the container system. Therefore, the actions for which an application container were designed to execute and the actions for which an application container are not meant to perform may not be clear. Despite this, a method for automatically determining the potential actions that a newly instantiated application container may perform, without expert analysis, is needed. An application container that has been attacked by a malicious individual can cause security breaches and potential compromises or service degradation of the entire container system and/or other application containers in the system by performing actions for which it was not designed to perform. Furthermore, as the owner of the application container may not have the ability to configure security systems on the shared container service, the security analysis of the application container may need to be provided by the container system instead.

This issue may be solved using the system 100 described herein. The policy interpreter 125 of the system is configured to analyze, via application container deployment configuration information 105 and dynamic running services information 110, among other data, the actions which may likely be taken by an application container during its normal course of execution (i.e., the "intent" of the application container). Using this information, the policy interpreter 125 further generates an application container network security policy 135, which can be used by a security system 140 of the container system to monitor the application container to determine whether it has been compromised by a malicious attacker. The following description provide additional details regarding the individual components of this system 100, including the application container deployment configuration information 105, the dynamic running services information 110, a protocol analyzer 120, a manifest detector 115, the policy interpreter 125, a policy template 130, an app container network security policy 135, the security system 140, and a graphical user interface (GUI) visualizer 145.

Application Container Deployment Configuration Information

The application container deployment configuration information 105 includes configuration settings for application containers. These configuration settings may define how to initiate an application container, resources to be used or allocated for the application container, and other settings related to the allocation container. The application container deployment configuration information 105 may include manifest data for an application container. The manifest data may be defined using any type of data description language, such as YAML (YAML Ain't Markup Language) or JSON (JavaScript Object Notation). The manifest data may describe one or more of the following information for the application container:

1) incoming and outgoing ports used by the application container;
2) services (i.e., software libraries or other application containers) to which the application container connects, including user account details used to access the services;
3) types of services (i.e., a broader category of services) to which the application container connects;
4) data types that the application container accepts and/or generates;
5) network protocols used by the application container (either incoming or outgoing);
6) network addresses (e.g., Internet Protocol (IP), Media Access Control (MAC)) for which the application container connects to or requests for itself;
7) memory resource allocation request (i.e., how much volatile memory to allocate to the application container);
8) processor resource allocation request (e.g., number of cores, processor cycles per minute, gigabyte-seconds);
9) non-volatile storage allocation request;
10) other hardware resource allocation requests (e.g., SIMD (single instruction multiple data) devices such as GPUs (graphical processing units));

11) user accounts to be created and/or allowed to access various functions of the application container at different privilege levels;
12) ingress and/or egress rules for the application container, specifying data to be received or to be transmitted for the application container, respectively;
13) a security level of data processed by the application container; and
14) estimated network traffic and/or resource usage patterns over time.

Although examples of possible configuration data have been provided here, the manifest data is not limited to this information and may include further data related to the configuration and/or instantiation of an application container.

As noted, this configuration data may be used by the policy interpreter 125 to generate the application container network security policy 135 for the application container. In some embodiments, one or more of the items of information in the manifest data may be further labeled using a specific pattern (e.g., a specific text pattern). This pattern may allow the policy interpreter 125 to determine the purpose and type of the information without further analysis by referring to a database of labels and corresponding security rules to be entered into the application container network security policy 135.

In addition, one or more of the above elements of the manifest data may define a set of service descriptors for the application container. These service descriptors describe the functions that the application container exposes to external entities, such as other application containers or users, and allows the external entities, to access the functions of the application containers if requests are made to the application container in the format and manner described by the service descriptors. These service descriptors may allow for a level of abstraction for accessing the application container without having to address the application container directly, which may be useful in the case where multiple copies of the application container exist for load balancing purposes.

An example of a manifest data in YAML format is provided in FIG. 2A and described in further detail below.

Dynamic Running Services Information

The dynamic running services information 110 includes information provided by the container system for running application containers executing in the container system. The dynamic running services information 110 may be determined using various system operating system commands (e.g., "top") or by executing commands associated with the container system (e.g., "kubectl describe deployment" in the case of Kubernetes). The dynamic running services information 110 may include information about:
1) the name of the application container;
2) the namespace of the application container;
3) creation date of the application container;
4) user-generated labels (i.e., identifiers) for the application container;
5) number of running instances of the application container and their status;
6) open network ports (to which other components or users can connect to the container);
7) software image location for the application container;
8) status indicators (e.g., availability, update status, etc.)
9) mounted volumes (i.e., data storage locations being accessed by the application container);
10) application container template specification (indicating a base configuration upon which the application container is based);
11) session affinity (i.e., whether requests are routed to the same instance of the application container on the same server);
12) locations (e.g., physical servers, logical groups) at which the application container may execute;
13) any network traffic policies used by the application container (e.g., quality of service, allowed traffic, etc.);
14) processes associated with the application container (including process identifiers such as process IDs, etc.);
15) open file and other resource handles requested by the application container; and
16) logging information (e.g., events, etc.).

Although examples of possible dynamic running services information 110 have been provided here, the dynamic running services information 110 is not limited to this information and may include other data related to the execution of the application container.

This dynamic information, along with the static application container deployment configuration information 105, is used by the policy interpreter 125 to generate the application container network security policy 135 for the application container.

An example of dynamic running services information 110 is shown in FIG. 2B and described in additional detail below.

Manifest Detector

The manifest detector 115 monitors for new application container instantiations and collects the application container deployment configuration information 105 and dynamic running services information 110 for these newly instantiated application containers. A newly instantiated application container is one that has been added to the container system, but may or may not already be in an initiated or executing state. The manifest detector 115 may periodically query the container system for new application containers. This may be achieved using various command line interface instructions (e.g., "kubectl get pods—all-namespaces" in the case of Kubernetes). The manifest detector 115 may use the command line interface instructions to determine a list of current application containers executing on the container system, and compare these with a list of previously logged application containers to determine the application containers which had been added to the container system. Alternatively, the manifest detector 115 may query the container system for newly added application containers, or may scan a repository of application container deployment configuration information 105 to determine whether new application containers have been added. For these newly added application containers, the manifest detector 115 may retrieve the application container deployment configuration information 105, including the manifest data, using additional command line tools (e.g., "kubectl get deploy [container name]-o yaml-export"). The manifest detector 115 may also gather the dynamic running services information 110 for these new application containers using additional command line interface instructions as described above.

The manifest detector 115 may store the application container deployment configuration information 105 and dynamic running services information 110 for newly discovered application containers in a database, with each application container in the database associated with a set of application container deployment configuration information 105 and/or dynamic running services information 110. The manifest detector 115 also sends the application container deployment configuration information 105 and/or dynamic running services information 110 to the policy interpreter 125 for processing.

Within the manifest data, the manifest detector 115 may also scan for service descriptors to determine if the application container exposes any functions to any internal or external networks. The service descriptors may specify a network port, address, and/or protocol with which to access the application container. The manifest detector 115 may also associate this information with the application container in the stored database.

Protocol Analyzer

In some example embodiments, the system 100 also may include a protocol analyzer 120 to scan for incoming and outgoing network connections for any application containers in the container system. If any incoming or outgoing network connections are detected which are directed to or originate from an application container, the protocol analyzer 120 may store metadata regarding the connection, such as 1) source, 2) destination, 3) network addresses, 4) network ports, 5) protocol used, 6) amount of data transmitted, 7) data throughput, 8) timestamp information, and so on. This metadata may be transmitted by the protocol analyzer 120 to the manifest detector 115, which may store it in the database and associate it with the respective application container.

Policy Interpreter

The policy interpreter 125 may receive data from the manifest detector 115 regarding newly initiated or added application containers and generates the application container network security policy 135 for the application container. This data may include the application container deployment configuration information 105, the dynamic running services information 110, and the metadata gathered by the protocol analyzer 120. The policy interpreter 125 may generate one or more security rules for the application container based on the data from the manifest detector 115 and stores these in the application container network security policy 135. These security rules determine the bounds for how the application container may operate. In one embodiment, the security rules are whitelist rules which allow for the application container to perform only those actions specified by the whitelist rules, and blocks all other actions. These actions may be indicated by the data from the manifest detector 115.

The whitelist rules generated by the policy interpreter 125 may include, but are not limited to, segmentation rules, routing rules, allowed process rules, file system rules, resource allocation rules, user access rules, and/or other behavior rules.

The policy interpreter 125 may generate the segmentation rules by identifying network connections from the application container to other application containers as indicated in the data from the manifest detector 115. These connections are translated into segmentation rules, while any connections not indicated in the data from the manifest detector 115 are not allowed as no segmentation rules are created for the application container for these connections. For example, if the application container deployment configuration information 105 for an application container indicates a database connection to an external database application container, then the policy interpreter 125 may create a segmentation rule to whitelist the connection between the application container and the database.

The policy interpreter 125 generates routing rules by determining whether the application container is reachable via an external network address, using the data received from the manifest detector 115. The policy interpreter 125 may scan the data to determine whether any external route is indicated, such as an externally reachable uniform resource locator (URL), load balanced traffic, SSL terminated traffic, among other specifications. The policy interpreter 125 generates a security rule to allow a route from the application container to and from the specified external route. For example, the policy interpreter 125 may scan the application container deployment configuration information 105 to determine that it is configured with an external URL. In response, the policy interpreter 125 generates a security rule allowing requests to the container system at that URL to be passed to the application container. A routing rule may also restrict the characteristics of data (e.g., type of protocol, type of data, etc.) that may travel on the network route to the application container. These characteristics may be determined by scanning the data from the manifest detector 115 for the corresponding characteristics associated with the indicated external route, and generating a routing rule that specifies that the external route is bound by these characteristics.

The policy interpreter 125 generates allowed process rules by determining the processes initiated by the application container upon initiation and over an initial period of time. The policy interpreter 125 may discover the processes using the dynamic running services information 110 received from the manifest detector 115 for the application container. Upon receiving the information, the policy interpreter 125 generates a security rule indicating that the processes indicated in the data from the manifest detector 115 are allowed, and any additional processes may be halted from execution.

The policy interpreter 125 generates file system rules by scanning the dynamic running services information 110 for the application container as received from the manifest detector 115 to determine if the application container has opened any file handles or accessed any storage locations upon initiation or during a period following the initiation. In response to determining that the application container has accessed one or more files and/or storage locations, the policy interpreter 125 may create one or more file system rules allowing the application container to access these files. The policy interpreter 125 may also scan the application container deployment configuration information 105 to determine if the application container requests access to certain file locations, such as a database, etc. The policy interpreter 125 may also create one or more file system rules allowing the application container to access these file locations in response to determining that the application container has requested these file locations.

The policy interpreter 125 generates resource allocation rules by scanning the data from the manifest detector 115 for the application container to determine the amount of memory, processor, and/or other resources which the application container has requested (e.g., via the application container deployment configuration information 105) or is actually using (e.g., via the dynamic running services information 110). The policy interpreter 125 generates a resource allocation rule which allows the application container to utilize resources up to the resource amounts indicated in the data from the manifest detector 115 for the application container. For example, if the policy interpreter 125 determines via the application container deployment configuration information 105 for the application container that 128 mb of memory is requested, the policy interpreter 125 generates a resource allocation rule allowing the application container to use up to 128 mb of memory, and to deny memory allocation requests beyond this amount.

The policy interpreter 125 may generate user access rules based on data from the manifest detector 115 indicating user accounts that are allowed to access the application container or user accounts that are used by the application container to connect to other application containers or other services. Upon detecting the existence of user accounts, the policy interpreter 125 may create user access rules allowing only the indicated user accounts to access the application container or to allow the application container to access the other application container or other service.

The policy interpreter 125 generates behavior rules by analyzing the dynamic running services information 110 and protocol data from the protocol analyzer 120 for an application container to determine a pattern of network activity and/or process activity of the application container. The manifest detector 115 may periodically update the data associated with an application container, and the policy interpreter 125 may scan this data for dynamic processes executing on the container system, as well as network activity associated with the application container. The policy interpreter 125 may generate one or more behavior rules matching the process activity and network activity recorded for the application container, such that any future actions performed by the application container matching these behavior rules will be allowed, while any actions not matching these rules may be blocked (e.g., at the network level or by halting execution).

For any of the above rules, the policy interpreter 125 may remove from the rule any reference to a specific network address, which allows the rule to be applicable to any network address rather than a specific source or destination. This allows the rule to be scalable to different source and destination network locations, as well as to non-container environments as well (e.g., cloud computing environments).

In addition, although various types of security rules are described above, the policy interpreter 125 may generate other types of security rules based on the data received from the manifest detector 115 for an application container. Any of these generated security rules may limit the actions performed by an application container to match those indicated by the data received from the manifest detector 115. For example, a security rule may be a blacklist rule instead of a whitelist rule.

The policy interpreter 125 may further request input from the user for creating any of the types of security rules described above. The policy interpreter 125 may indicate to the user (e.g., via the graphical user interface visualizer 145) the rules that have been automatically generated, and receive from the user modifications to the generated rules or one or more additional user-generated security rules. These user-generated security rules may match one of the types described above. The policy interpreter 125 may also be requested by a user to create security rules for the application container based on a template. This template may be specified as a set of user-generated rules, or by referring to automatically generated rules for another application container.

After generating the security rules, the policy interpreter 125 stores these security rules in the application container network security policy 135. Each application container may have an associated application container network security policy 135. The application container network security policy 135 may be shown to a user via the graphical user interface visualizer 145 and enforced using the security system 140.

Policy Template

The policy template 130 includes one or more default security rules for which the policy interpreter 125 may apply to every application container network security policy 135. These many include any of the one or more types of security rules described above. An administrator may choose to include these additional default security rules in order to prevent any application container in the container system from performing any unwanted or insecure actions, such as allowing unsecured connections, etc.

Application Container Network Security Policy

The application container network security policy 135 is generated by the policy interpreter 125 and specifies one or more security rules which define the scope of the actions that can be performed by the application container. The security rules may be considered a whitelist, as any actions that may be performed by the application container but which are not specified in the security rules would not be allowed. The application container network security policy 135 may be stored in a database and associated using an identifier with the respective application container. As each application container network security policy 135 may include a multitude of different rules, the security rules in the application container network security policy 135 may be stored in a manner to allow for efficient retrieval of data. For example, the security rules may be stored in a tree format, such that rules related to one type of data are in different branches, allowing efficient lookup of the rules.

Security System

The security system 140 applies the security rules specified in the application container network security policy 135. Any actions that are performed by the application container may be detected by the security system 140. These may include access to other application containers, receiving and transmitting data, accessing resources, and so on. The security system 140 checks the action of the application container with the security rules for the application container as specified in the application container network security policy 135, and determines if a security rule matching the action (i.e., allowing the action to proceed) exists. If a security rule exists, no additional action may be taken by the security system 140. If no security rules are matched, the security system 140 may transmit an alert to a designated address, and may block the action from occurring, by blocking the network data from being transmitted or received, or by halting the further execution of the application container in the case of a non-network action.

The disclosed configuration allows the security system 140 to allow the application container to perform only those actions that were indicated by the application container deployment configuration information 105, any initial dynamic running services information 110 for the application container, and any initial network activity for the application container. Any deviation from this initial activity or the configuration information for the application container may indicate a security compromise of the application container, and is therefore blocked by the security system 140. The security system 140 therefore restricts the application container from performing actions that exceed its original "intent." These actions that do not match the "intent" of the application container are likely to be actions that the application container was not designed to perform, and may likely be malicious and due to a compromise with the application container by a malicious attacker.

As noted, the security system 140, upon detecting that an action performed by the application container is not allowed by any security rule, may, in addition to blocking the action from occurring, transmit an alert to a user indicating the issue. The user, who may be an owner of the application container and/or may be a system administrator, may have the option to allow the action to occur, in which case the security system 140 may create a new security rule for the application container indicating that the detected action is allowed.

Graphical User Interface Visualizer

The graphical user interface (GUI) visualizer 145 presents the security rules of the application container network security policy 135 to a user, e.g., an owner of the application container, for review. The GUI visualizer 145 may also present any alerts in the event that the security system 140 determines that the application container performs an action that is not allowed by the application container network security policy 135. The GUI visualizer 145 may present an interface to allow the user to add and remove security rules from the application container network security policy 135. The GUI visualizer 145 may also present information regarding current actions being performed by the application container and whether any of these actions violate any security rules of the application container network security policy 135 for the application container. An example of the GUI generated by the GUI visualizer 145 is presented in FIGS. 3A-3B and described with additional detail below.

Example Information for an Application Container Used to Generate Security Policy FIG. 2A is an example of manifest data of an application container deployment configuration information 105 for two application containers, according to an example embodiment. The manifest data illustrated here uses the YAML description language. It illustrates manifest data for two application containers, "db" or database, and "wordpress," a blog.

For the database application container, the image name of the database software executable is indicated ("mysql:5.7"). If scanned by the policy interpreter 125, one or more security rules (e.g., file access rules) may be generated to allow the application container to access the image file, and execute processes associated with the database software. Various names and labels are assigned. In one embodiment, the policy interpreter 125 may generate specific security rules based on detecting certain keywords in these labels or names. For example, a service name label of "Database" as shown may cause the policy interpreter 125 to create a set of security rules to allow actions associated with executing a database program. The manifest data for the database service further includes information about a volume for which the application container can access, specified here as a mount location. In response to detecting this volume information, the policy interpreter 125 may create a security rule to allow the application container to access the specified mount location. The manifest data also includes username and password information for the database, to allow the "wordpress" service to access the database. In response to detecting this information, the policy interpreter 125 may generate one or more user access rules as described above to allow the user access to the database.

For the "wordpress" application container, many of the same elements described above for the "db" application container are shown here as well, and similar security rules are generated in response to detecting these similar elements. An image and labels and names are indicated for the "wordpress" blog software. The "wordpress" application container manifest data also indicates a "links" section indicating a connection to the "db" application container. In response to detecting such a connection, the policy interpreter 125 may create a security rule indicating that the "wordpress" application container may connect to the "db" application container. The "wordpress" application container manifest data also indicates network ports (incoming and/or outgoing). The policy interpreter 125, upon detecting this network port information, may generate one or more security rules allowing communication with the application container using these ports. The "wordpress" manifest data further includes multiple environment variables indicating usernames and passwords for accessing the "mysql" database application container. As described above, the policy interpreter 125 may generate one or more user access rules upon detecting these variables describing user information.

FIG. 2B is an example of dynamic running services information 110, according to an example embodiment. In particular, FIG. 2B illustrates the output from a command line instruction listing dynamic running information regarding a set of exemplary application containers.

The command line interface instruction illustrated here, "$kubectl describe service-n demo," is a command line interface for the container system Kubernetes, for the "demo" namespace, which is a label encompassing several application containers. Executing this instruction causes the container system to list information for the application containers in this namespace. Additional command line interface commands may also be used to gather related information. As noted above, this information may include a wide variety of details regarding the application containers.

In FIG. 2B, similarly to the manifest data described in FIG. 2A, the dynamic running services information 110 includes identifiers, such as labels, names, and selectors. The policy interpreter 125, may, upon encountering specific identifiers, generate a specific set of security rules in response. The security rules that are generated may depend upon the identifier that is encountered. The dynamic running services information 110 also includes network information, such as network addresses, network ports, and network protocols. Upon encountering this information, the policy interpreter 125 may generate one or more security rules allowing communication on the network to these network addresses, ports, and using the indicated protocols. The policy interpreter 125 may also determine that as the three application containers are on the same namespace, the "nginx" application container connects to the "node" application container (via HTTP as indicated by the port 80) and the "node" application container connects to the "redis" application container (via Redis as indicated by the port 6379). In response, the policy interpreter 125 generates one or more security rules allowing these connections (and with the specific protocols). Any other connections (or using other protocols) would be disallowed.

FIG. 2C is another example of dynamic running services information, according to an example embodiment. The dynamic running services information 110 of FIG. 2C may also be accessed by the manifest detector 115 and provided to the policy interpreter 125. The information shown in FIG. 2C displays network information for the application containers and may be queried by using various command line interface commands of the container service to query running services. Here, the dynamic running services information 110 shows that the "node-pod" application container (i.e., the container that matches the "node-pod" label in accordance with the "matchLabels" directive) is to ingress data from the "nginx-pod" application container on port 8888 and egress data to the "redis-pod" application container on port 6379. After analyzing this information, the policy interpreter 125 may determine that the "node-pod" application container receives data from the "nginx-pod" and transmits information to the "redis-pod" on the indicated ports. Upon determining this information, the policy interpreter 125 may generate one or more security rules to whitelist these particular connections to the specified application containers, and may also optionally restrict the connections to the specified port numbers.

Figure 3A:
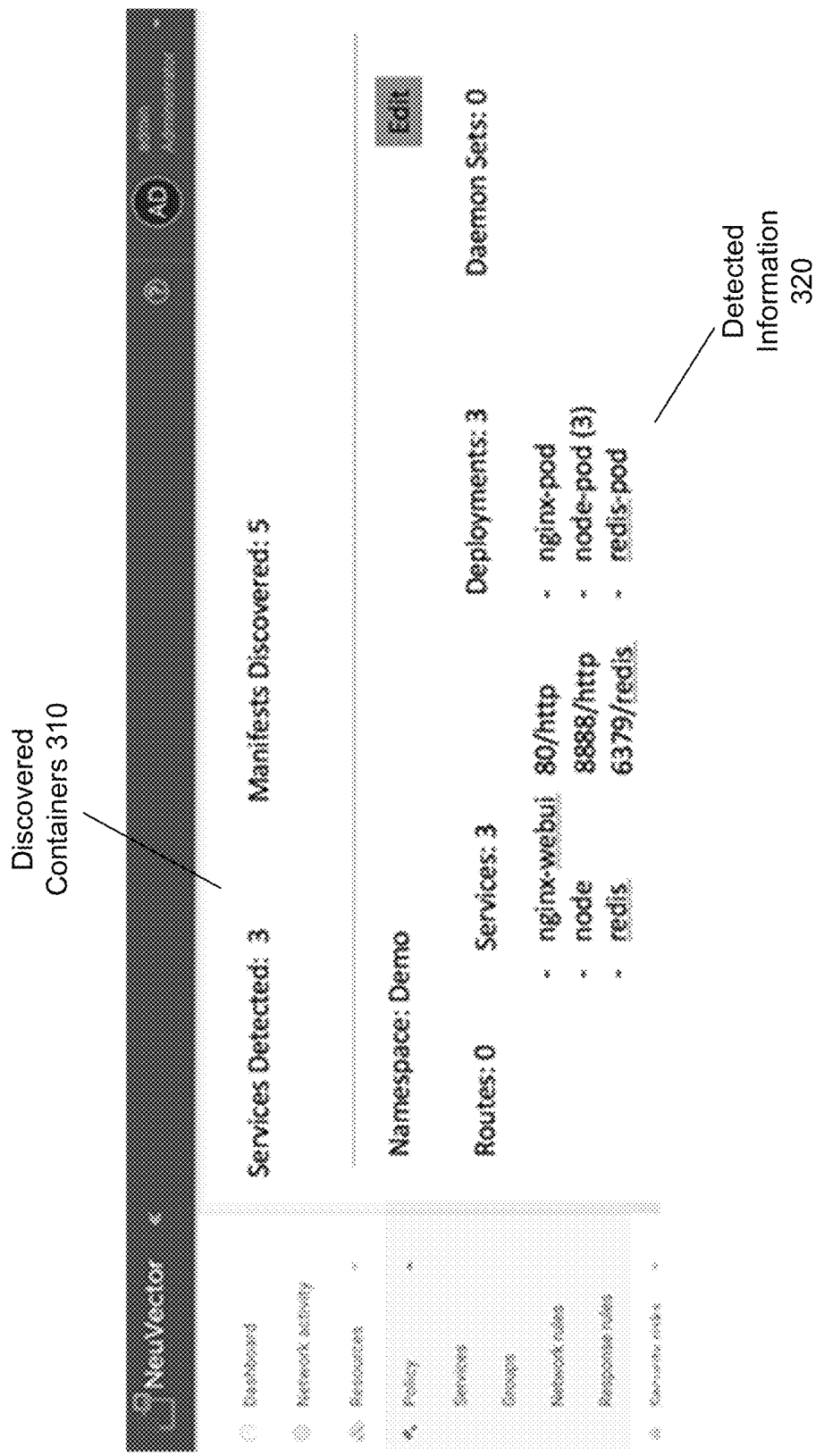
FIG. 3A is an exemplary user interface presenting a set of results from scanning a container system for application container deployments, according to an example embodiment.

FIG. 3A is an exemplary user interface (UI) 300 presenting a set of results from scanning a container system for application container deployments, according to an example embodiment. The UI 300 may be generated by the GUI visualizer 145 based on the various application container network security policies 135 generated by the policy interpreter 125 for the application containers in the system. Here the discovered containers 310 are shown. As shown, five manifests are discovered, with three unique "services", as the "node" container has three instances. Additional details are provided in the detected information 320, showing the three unique application containers along with the three copies of the "node" application container. This allows a user to be able to easily visualize the number of application containers executing on the container system, rather than parsing through the command line results shown in FIG. 2B or 2A, which would be difficult to understand and include unnecessary information.

Figure 3B:
FIG. 3B is an exemplary user interface presenting a set of security rules generated by the policy interpreter from scanning a container system for application container deployments, according to an example embodiment.

FIG. 3B is an exemplary user interface (UI) 350 presenting a set of security rules generated by the policy interpreter 125 from scanning a container system for application container deployments, according to an example embodiment. As illustrated, three security rules are shown. However, the system is not limited to three and additional security rules may be generated for a set of application containers.

As illustrated, the UI 350 shows for each security rule an identifier of the security rule, a "from" heading and a "to" heading indicating the source and destination identified in the rule, an "application" heading indicating a network protocol that is identified in the rule, and a network port, if any, identified in the rule. The source and/or destination may indicate an application container, external source, or other network location. The UI 350 also indicates for each rule under the "action" heading whether the rule is to allow the indicated network connection from the source to the destination via the network protocol and with the indicated network port (if any). Finally, the "type" heading for each rule, which corresponds to a colored legend, indicates whether the rule is a new rule, modified rule, customer rule, learned rule, removed rule, or disabled rule. In the case where the rule is a learned rule, as shown above, the various attributes of the security rule, such as the source and destination, are identified using the data received from the manifest detector 115 for the application container. An additional details tab is available for each rule to provide additional details regarding the security rule, which may provide additional information about the security rule, such as the application container it is associated with, when the rule was created, a presentation of the data received from the manifest data 115 that was used to generate the rule (if it is a learned rule), and so on.

Such an interface allows for the user to easily view and modify the rules for all application containers within the system, rather than analyze a command line interface and modify the security rules via the issuance of multiple command line instructions in order to change attributes of a single rule. The UI 350 also allows a user to easily determine how a security rule was generated, whether by a user, or how the policy interpreter 125 generated the rule. This may allow the user to have a means of providing feedback by modifying rules generated by the policy interpreter 125. If the policy interpreter 125 determines that a same type of modification is being performed for a same type of rule beyond a certain threshold, the policy interpreter may modify the method in which it creates the rule in order to match the modification that is being made in order to reduce the number of manual user modifications needed. The user may also be able to specify via the UI 350 a set of logical rules to the policy interpreter 125 indicating a type of security rule to be generated upon detecting certain elements in data received from the manifest detector 115, such as certain labels, or other elements.

Example Container Architecture

Figure 4:
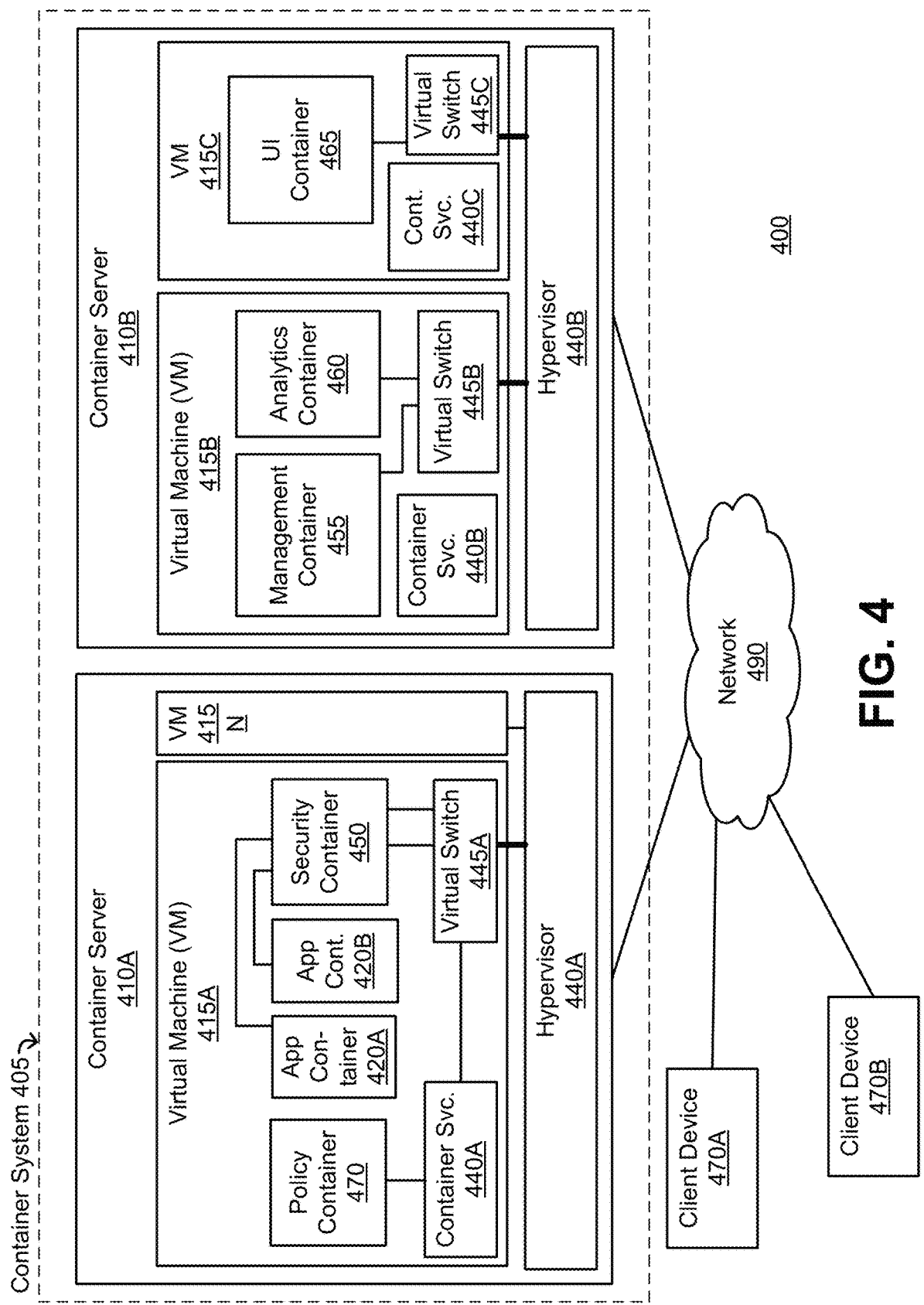
FIG. 4 illustrates an example system with an exemplary container architecture in which the security policy system of FIG. 1 may operate, according to an embodiment.

Referring now to FIG. 4, it illustrates an example system 400 with an exemplary container architecture in which the security policy system 100 may operate, according to an embodiment. The system 400 includes the network 490, one or more client devices 470, one or more container servers, e.g., 410A, 410B (generally, 410) of a container system 405, with each container server 410 including one or more application ("app") containers, e.g., 420A, 420B (generally 420). A container server 410 also may include a security container 450, a management container 455, an analytics container 460, and/or a user interface (UI) container 465. Although the two illustrated container servers 410A and 410B include different containers, this is not meant to indicate that the container servers 410A and 410B are different. The containers within each container server 410 may be interchangeable, and thus each container server 410 is largely the same. In addition, one or more of the container servers 410 may include a policy container 470, which performs the functions of the system 100 as described above. Although the illustrated system 400 may include the elements shown in FIG. 4, in other embodiments the system 400 may include different elements. Furthermore, the functionalities of each element may be distributed differently among the elements in other embodiments. In the environment 400, the intercept container, such as intercept container 120, may reside in the security container 450. In one embodiment, the container system 405 is the container system 102 of FIG. 1.

The network 490, which can be wired, wireless, or a combination thereof, enables communications among the client devices 470 and the one or more container servers 410 of the container system 405 and may include the Internet, a local area network (LAN), virtual LAN (VLAN) (e.g., with VPN), wide area network (WAN), or other network. In one embodiment, the network 490 uses standard communications technologies and/or protocols, such as Hypertext Transfer Protocol (HTTP), Transmission Control Protocol/Internet Protocol (TCP/IP), Uniform Resource Locators (URLs), and the Doman Name System (DNS). In another embodiment, the entities can use custom and/or dedicated data communications technologies instead of, or in addition to, the ones described above.

The client devices 470 are electronic devices used by users to perform functions such as consuming digital content, executing software applications, browsing websites hosted by web servers on the network 490, downloading files, and interacting with the container servers 410. For example, the client devices 470 may be dedicated e-readers, smartphones, wearables (e.g., smartwatches or pendants), or tablets, laptops, or desktop computers configured similar to an exemplary machine (or computing system) described with FIG. 6. A client device 470 may include one or more applications, such as a web browser, to interact with services provided by the container servers 410. Although two client devices 470 are illustrated in FIG. 4, in other embodiments the environment 400 includes more client devices 470.

The container servers 410 are electronic devices that communicate via network 490 and may execute hypervisors, virtual machines (VMs), and one or more containers. Each container server 410 may be located at a different physical location than another container server 410. However, the container servers 410 may communicate with each other via dedicated network links, such as a tunnel. This may allow services on each container server, such as the container services 430, to communicate with each other within a virtual local network. In one embodiment, the container servers 410 include an operating system that enables operating-system-level virtualization, such that the kernel of the operating system allows for multiple isolated user-space instances (i.e., "containers"). In one embodiment, the container servers 410 include an operating system that enables hardware virtualization, which is a method of simulating or emulating a separate set of hardware resources on which a guest operating system or other software to executes. In such a case, the container server 410 may include one or more hypervisors 440 for hardware virtualization, on which one or more virtual machines (VMs) 415 execute. In another embodiment, one or more VMs 415 may be represented by the host 150.

The hypervisor 440 is a software and/or hardware component executing on the container server 410 that creates and runs the VMs 415. The hypervisor 440 may execute directly on the hardware (e.g., processor, memory, storage, etc.) of the container server 410, may execute on an operating system of the container server 410, or may execute using a hybrid of these two (e.g., in the case of a Kernel-based Virtual Machine (KVM)). The ability to execute multiple VMs on a single hardware platform expands the capabilities of the hardware platform and simplifies management, while improving security. Furthermore, multiple different operating system versions and platforms may execute on each VM, while all using the same hardware platform.

The VMs 415 are emulations of a computer system or hardware platform. Each VM 415 emulates, either fully or partially, a set of hardware resources for a computer system. For example, the VM 415 may emulate a processor, memory, storage, graphics adapter, interrupts, and so on. Although the emulation may increase the resources needed to execute a task, and may lower efficiency, as noted, the VM 415 provides other benefits, such as the execution of multiple operating system versions and high availability, among other features.

Each VM 415 may execute an operating system that supports a container environment. As used here, container environment refers to the system upon which the containers are executing. In the illustrated example, the container environment is the VM 415 and operating system executing on the VM 415. However, in other cases, the container environment may be a physical system such as the container server 410 itself and the operating system executing on that container server 410.

As noted, an operating system may support a container environment by having a kernel that has enabled operating-system-level virtualization for multiple isolated containers, along with additional resource management features, which limit the resources allocated to each isolated container. For example, for each container executing within the operating system, a kernel may limit the amount of resources (e.g., memory, processor cycles) provided to that container through the use of various resource management components of the operating system (e.g., thread priority, memory allocation, etc.).

In one embodiment, the kernel may be a Linux kernel, and may support resource isolation features such as chroot, cgroups, kernel namespaces, and union-capable file systems (e.g., aufs) in order to isolate each container. These features restrict each container's view of the operating system's resources. Instead, each app container may only see a set of virtual resources. For example, an app container 420 may only be able to view file systems that are authorized for that app container 420. In one embodiment, the kernel may be a FreeBSD kernel, and the operating-system-level virtualization functions may be implemented in a "jail" system call. Compared to virtual machines, operating-system-level virtualization does not incur an emulation overhead, do not require a separate disk image for each container, are more resource-efficient as dedicated resources do not need to be allocated per container, may be more efficiently threaded, and so on. However, the container may still execute within a VM. Although the container environment is described here as executing within a VM 415, in another embodiment the container environment executes directly on the hardware of the container server 410.

The virtual switch 435 may emulate a hardware switch in software, and may be similar to the virtual switch 152. Although the virtual switch 435 is shown to execute within the VMs 415, in other embodiments the virtual switch 435 executes within the hypervisor 440. In a packet-switched environment, a hardware switch receives packets with an indicated destination network address and routes these packets to an output port which is connected to a path on which the destination with the destination network address exists. The hardware switch also may support various management interfaces and protocols (e.g., quality of service (QoS). Similarly, the virtual switch 435 may provide functions that are similar to the above-described hardware switch, but instead of being implemented in hardware, the virtual switch 435 may be implemented in software (or in a hybrid software/hardware implementation). For example, the virtual switch 435 may route communications arriving at the container server 410 or VM 415 to the correct container or other service within the container server 410 or VM 415. As another example, the virtual switch 435 may route communications between containers of the same container server 410 or VM 415. The virtual switch 435 performs the routing using the network addresses of each container executing within the container server 410. While the virtual switch 435 is shown to be part of the VM 415 in the illustrated embodiment, in another embodiment the virtual switch 435 may be part of the hypervisor 440 or the VM 415 and the hypervisor 440 may each have a virtual switch.

The container service 430 is a collection of services to assist with the deployment and execution of containers on the VMs 415. Although two container services 430A and 430B are illustrated, they perform similar functions and are described together here. The container service 430 may include an application programming interface (API) for the use of software developers creating containerized software. The API may allow a software developer to easily create a containerized software application without having to implement operating system and operating system version specific functions, which are instead implemented by the container service 430. For example, the container service 430 may offer API function calls that may be used by a container to perform certain functions related to creating a container. The container service 430 may manage the isolation of resources for each container. These resources may include filesystem resources (e.g., system libraries), user and user groups, process trees (e.g., viewable processes), network resources, device resources, and inter-process communication resources (e.g., semaphores). The container service 430 may perform the isolation through the use of permissions restrictions, disk quotas, central processor unit (CPU) scheduling, input/output (I/O) scheduling, counters (e.g., beancounters), and so on.

The API of the container service 430 also may include functions to allow for a software developer to easily deploy containers on multiple hardware platforms in a distributed fashion, and for each container to be able to share data with other containers in a seamless fashion. For example, the container service 430 may allow one container to be able to access a same shared pool of data as another container through a standard API, without the need to manage the memory space directly.

The container service 430 also may be able to combine multiple container servers 410 or other hardware platforms into a single virtual host (e.g., a clustered host). The container service 430 also may include extensions to allow for easy integration with cloud services providers, such that a software developer may easily deploy a containerized application to one of these cloud services. Examples of container services include Docker®, Kubernetes®, and so on.

After receiving a request from an app container 420 (e.g., via the API), the container service 430 may also create a connection between the app container 420 and the virtual switch 435. This connection includes a port pair, with one port connected to the virtual switch 435, and the other pair connected to the app container 420. This connection also may include the network hardware layer address (e.g., media access control (MAC) address) and network address (e.g., Internet Protocol (IP) address) for the app container 420. This information provides the app container 420 with its own network address and isolated network path. The connection may be used by the app container 420 to route to other containers or destinations that are connected to network 490. The container service 430 also may provide the connection as a tunneled connection.

The app container 420 is a containerized software application executing in the container system 405, and may be similar to the app containers described above. In the illustrated embodiment of FIG. 4, the app container 420 is executing in the VM 415. However, in other embodiments, the app container 420 may execute directly on the container server 410 (via the operating system level virtualization of the container system 415) and not within a VM. Although two app containers 420A-B are shown here, in other embodiments each VM 415 (or container server 410) may have multiple app containers. The app container 420 may include any executable code as created by a software developer. The app container 420 may include a network interface to communicate with other entities in the network 490 via the virtual switch 435. As noted, each app container 420 may be isolated from other app containers 420. Each app container 420 may thus be in its own "domain." As noted, these domains may be created using different method of operating-system-level virtualization, such as through the use of namespaces (e.g., Linux namespaces).

In one example embodiment, the app container 420 may be stored as one or more images that include the executable code and other data for the containerized software application of the app container 420. Each image in the app container 420 may include updates and changes to the software application. These images may be part of a union file system, and may be joined together by the container service 430, along with a base image, in order to generate the complete application package. The running app container 420 comprises this complete application package. An additional read-write layer also may be added by the container service 430 to the running app container 420, as the images are read only.

The security container 450 may intercept communications from the app containers 420 for network security monitoring. As noted above, in a typical containerized environment, the container service 430 facilitates the connection of an app container 420 to the network 490. This connection may also be tunneled using an encryption protocol (e.g., secure sockets layer (SSL)). Due to this type of connection, intercepting the traffic of the app container 420 transparently is challenging. Furthermore, each container is self-contained, and as noted above, may be packaged as a read-only image. Thus, modifying the app container itself also may be undesirable.

Instead, the security container 450 monitors the VM 415 (or container server 410 if the container environment is the container server 410 itself) to determine if any new app containers 420 are created. To monitor the container environment, the security container 450 may communicate with the container service 430 or request for and/or be given special administrative rights that allow it to query or determine the processes executing on the VM 415. When the security container 450 determines that a new app container 420 is created and connected to the virtual switch 435, the security container 450 may intercept the network traffic of the new app container 420 by moving the connection between the virtual switch 435 and the new app container 420 such that the connection may be made between the virtual switch 435 and the security container 450 instead. The security container 450 also may create a new connection between the new app container 420 and the security container 450. The security container 450 may also save and recover any existing routing entries during this process.

After performing this intercept operation, network traffic to and from the new app container 420 flows through the security container 450. The security container 450 may be able to monitor this traffic and inspect it to determine if a network security issue exists. The security container 450 may perform various actions on the traffic, such as forwarding it, making a copy of it, and so on. Although a single security container 450 is illustrated, the container system 405 may include multiple security containers 450 clustered together.

Although the app containers 420 are illustrated as connecting to the security container 450 before connecting to the virtual switch 435, in other embodiments the app containers 420 connect directly to the container service 430, and the security container 450 intercepts traffic from the app containers 420 via the container service 430, which may forward traffic from the app containers 420 to the security containers 450.

The container system 405, in one embodiment, also includes an analytics container 460 to analyze information received from the security containers 450. The analytics container 460 may request or receive longs and statistics from the security containers 450 regarding intercepted network traffic and other data. The analytics container 460 may analyze this information to produce various results. For example, the analytics container 460 may determine whether a denial of service attack is occurring within some of the application containers 420. The analytics container 460 may also forward the information and analytical results to the management container 455. The container system 405 may include multiple analytics containers 460 to allow for redundancy and high availability.

The container system 405, in one embodiment, also includes one or more management containers 455 for configuration and monitoring of the security containers 450 in the container system 405. The management container 455 may configure the settings and rules for the security containers 450 and the analytics container 460 in the container system 405. For example, these rules may indicate what type of network traffic to log or to filter out. The management container 455 monitors the activities of other management containers 455 and the security containers 450. Activities monitored may include start/stop activities, statistics, and so on. The management container 455 may also listen for reports and other information from the analytics container 460. Additionally, the management container 455 may receive instructions from the user interface (UI) container 465 regarding the configuration of rules in the security containers 450 and other options. Furthermore, the management container 455 may also present the reports and other information collected by the security containers 450 and analytics containers 460 to a user via the UI container 465. The container system 405 may include multiple management containers 455 to allow for redundancy and high availability.

The container system 405, in one embodiment, also includes a user interface (UI) container 465 to provide a user interface to a user. The UI container 465 may interface with a user using a graphical user interface (GUI) or a command line interface (CLI). As noted above, the UI container 465 communicates with the management container 455 and via the user interface the UI container 465 may indicate to the management container 455 the various configuration options requested by a user. The UI container 465 may also receive information, such as various analytical reports, statistics, and other data from the management container 455. If the interface is a GUI, the interface may be presented using various GUI elements, such as drop-down menus, tables, and so on, and may be interfaced using interface devices such as a mouse and touchscreen. The UI container 465 may also present the data received from the management container 455 using various graphical presentation schemes, such as a scatterplot, table, graph, and so on. In one embodiment, the UI container 465 may perform the functions associated with the GUI visualizer 145 as described above.

The container system 405 also includes the policy container 470, which may perform the functions of the manifest detector 115, protocol analyzer 120, and policy interpreter 125 described above with respect to FIG. 1. The application container deployment configuration information 105 and dynamic running services information 110 may be received by the policy container 470 by querying the container service 440, using the various command line interface commands noted above. As described, this information may be used to generate an application container network security policy 135 for each application container. The security rules in the application container network security policy 135 may in turn be enforced by the security container 450, which performs the functions of the security system 140 described in FIG. 1.

Example Flows

Figure 5:
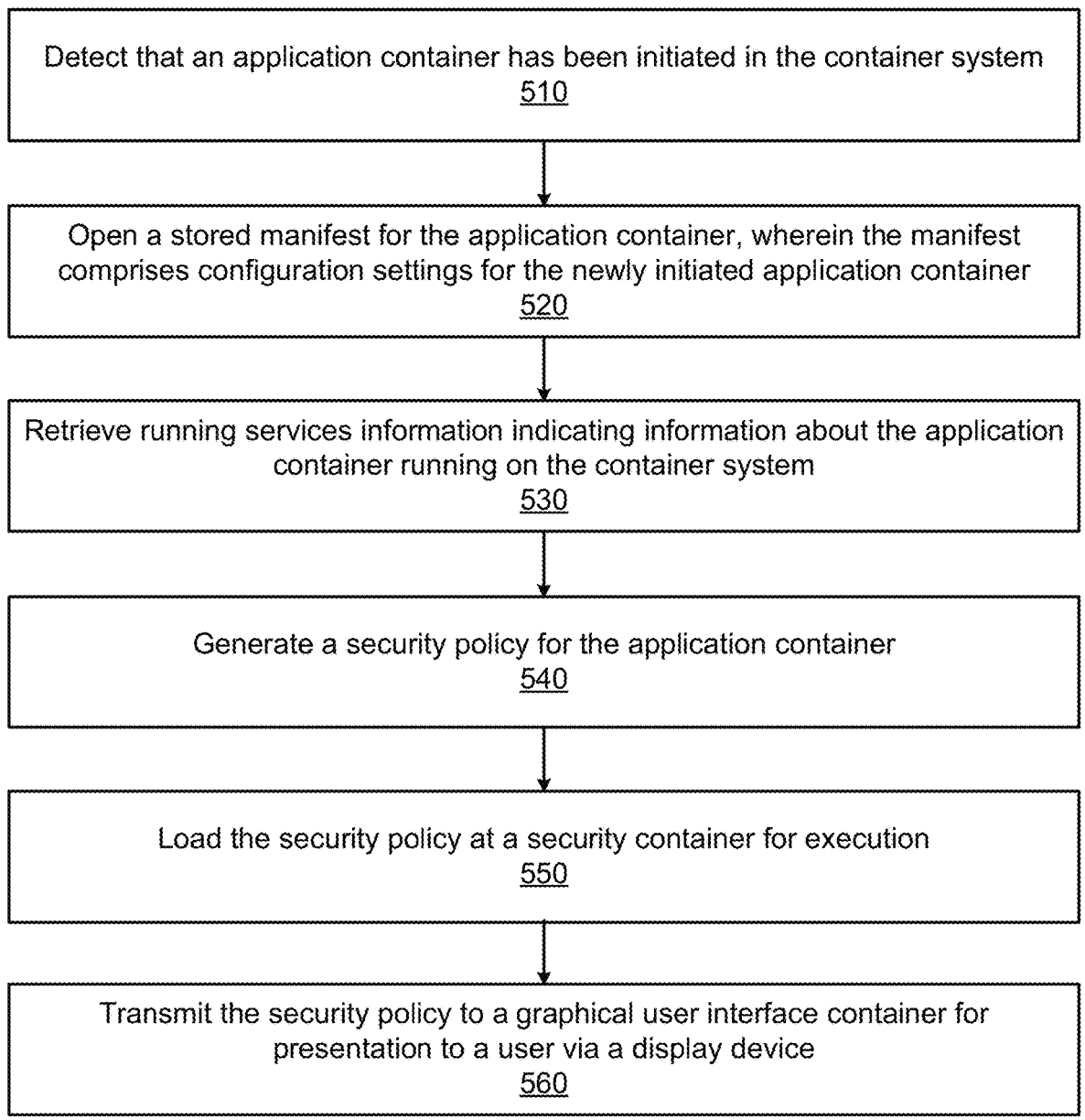
FIG. 5 is a flow chart illustrating an exemplary method for generating a network security policy for an application container using application configuration information and dynamic services information, according to one embodiment.

FIG. 5 is a flow chart illustrating an exemplary method 500 for generating a network security policy for an application container using application configuration information and dynamic services information, according to one embodiment. In one embodiment, FIG. 5 attributes the steps of the method 400 to the policy container 470. However, some or all of the steps may be performed by other elements (e.g., the security container 450). In addition, some embodiments may perform the steps in parallel, perform the steps in different orders, or perform different steps. Also, it is noted that in one example embodiment the steps and/or modules may be embodied as instructions, e.g., instructions 624, that may be executed by the processor 602 described with respect to FIG. 6.

The policy container 470 detects 510 that an application container has been initiated in the container system. The application container includes computer-readable instructions and is initiated via a container service and isolated using operating system-level virtualization.

The policy container 470 opens 520 a stored manifest for the application container. The manifest comprises configuration settings for the newly initiated application container. The manifest may be the manifest data of the application container deployment configuration information 105 described above.

The policy container 470 retrieves 530 running services information regarding the application container. The running services information includes information provided by the container service about the application container running on the container system, and may correspond to the dynamic running services information 110 of the application container.

The policy container 470 further generates 540 a security policy for the application container. The security policy defines a set of actions for which the application container can perform, and the set of actions are determined using the manifest and the running service information associated with the application container.

The policy container 470 loads 550 the security policy at the security container (e.g., security container 450). The security container is configured to, upon loading the security policy, block an action performed by the application container in response to determining that the action performed by the application container does not match any action in the set of actions defined in the security policy for the application container.

The policy container 470 transmits 560 the security policy to a graphical user interface container (e.g., UI container 465) for presentation to a user via a display device. The graphical user interface container presents information about the generated security policy.

Example Machine Architecture

Figure 6:
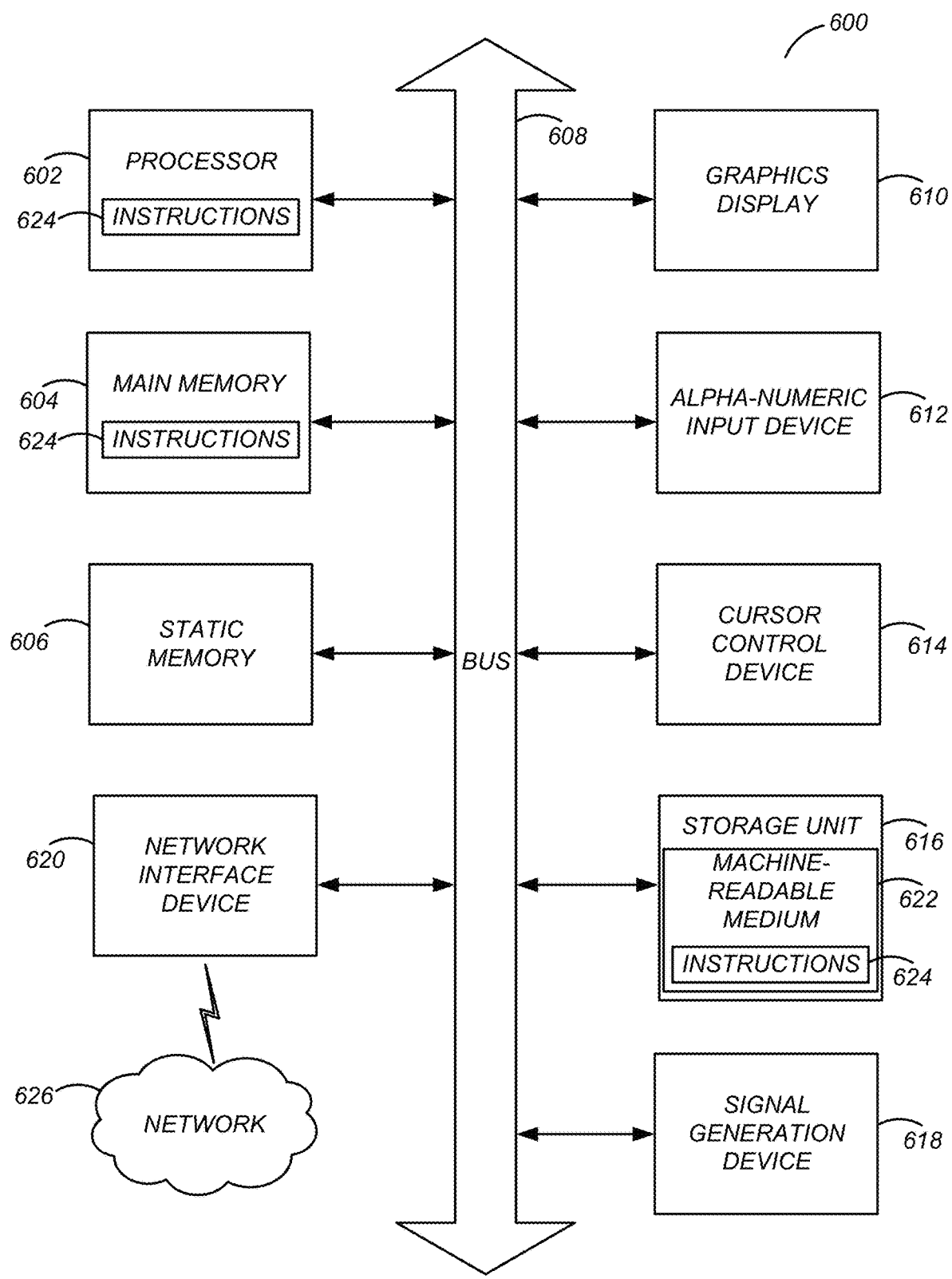
FIG. 6 is a block diagram illustrating components of an example machine able to read instructions from a machine-readable medium and execute them in a processor (or controller).

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. The computer system 600 is used to execute the processes and functionality described in FIGS. 1 and 5, such as the container system 405, policy container 470, and so on.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604 and the storage unit 616 communicate via a bus 608.

In addition, the computer system 606 can include a static memory 606, a display driver 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONSIDERATIONS

The system as disclosed provides benefits and advantages that include the ability to generate a security policy based on application container configuration information and dynamic running services information provided by a container service. This is a technical solution to the technical problem of how to automatically generate and enforce network security for application containers which are instantiated and removed at a rapid pace within a container system.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-6. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., 602) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software (e.g., instructions 624) to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors 602 or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 604). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating a security policy based on application container configuration information and dynamic running services information provided by a container service. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method in a container system, comprising:
   detecting that an application container has been added in the container system, the application container having computer-readable instructions, the application container initiated via a container service and isolated using operating system-level virtualization;
   opening a stored manifest for the application container, the stored manifest comprising configuration settings for the newly added application container, wherein the stored manifest for the application data further comprises information indicating an image file in which executable code for the application container is stored, incoming and outgoing ports for the application container, services to which the application container connects, and user credentials to access the services;
   retrieving running services information regarding the application container, the running services information including information provided by the container service about the application container running on the container system;
   generating a security policy for the application container, the security policy defining a set of actions for which the application container can perform, the set of actions determined using the manifest and the running service information associated with the application container;
   loading the security policy at a security container, the security container configured to, upon loading the security policy, block an action performed by the application container in response to determining that the action performed by the application container does not match any action in the set of actions defined in the security policy for the application container; and
   transmitting the security policy to a graphical user interface container for presentation to a user via a display device, the graphical user interface container presenting information about the generated security policy.

2. The method of claim 1, wherein detecting that an application container has been added comprises periodically querying the container service for initiated application containers.

3. The method of claim 1, wherein opening a stored manifest for the application container further comprises executing a command line interface instruction to cause the container service to output manifest data for the application container.

4. A computer container system comprising:
   one or more application containers, each application container including computer-readable instructions and initiated via a container service and isolated using operating system-level virtualization;

a computing device comprising memory and a processor, the memory configured to store code instructions, the code instructions, when executed by the processor, cause the processor to:

open a stored manifest for the application container of the one or more application containers has been added in the container system;

open a stored manifest for the application container, the stored manifest comprising configuration settings for the newly added application container, wherein the stored manifest for the application data further comprises information indicating an image file in which executable code for the application container is stored, incoming and outgoing ports for the application container, services to which the application container connects, and user credentials to access the services;

retrieve running services information regarding the application container, the running services information including information provided by the container service about the application container running on the container system; and generate a security policy for the application container, the security policy defining a set of actions for which the application container can perform, the set of actions determined using the manifest and the running service information associated with the application container;

a security container operating to load the security policy, the security container configured to block an action performed by the application container in response to determining that the action performed by the application container does not match any action in the set of actions defined in the security policy for the application container; and a graphical user interface container operating to present information about the generated security policy to a user via a display device.

5. The container system of claim 4, wherein the computing device policy container further operates to periodically query the container service for initiated application containers.

6. The container system of claim 4, wherein the computing device further operates to execute a command line interface instruction to cause the container service to output manifest data for the application container.

7. A non-transitory computer storage readable medium comprising stored instructions, the instructions when executed by a processor, causes the processor to:

detect that an application container has been added in the container system, the application container including computer-readable instructions, the application container able to be initiated via a container service and isolated using operating system-level virtualization;

open a stored manifest for the application container, the stored manifest comprising configuration settings for the newly added application container, wherein the stored manifest for the application data further comprises information indicating an image file in which executable code for the application container is stored, incoming and outgoing ports for the application container, services to which the application container connects, and user credentials to access the services;

retrieve running services information regarding the application container, the running services information including information provided by the container service about the application container running on the container system;

generate a security policy for the application container, the security policy defining a set of actions for which the application container can perform, the set of actions determined using the manifest and the running service information associated with the application container;

load the security policy at a security container, the security container configured to, upon loading the security policy, block an action performed by the application container in response to determining that the action performed by the application container does not match any action in the set of actions defined in the security policy for the application container; and transmit the security policy to a graphical user interface container for presentation to a user via a display device, the graphical user interface container presenting information about the generated security policy.

8. The non-transitory computer storage readable medium of claim 7, storing further instructions, that when executed by the processor, causes the processor to periodically query the container service for initiated application containers.

9. The non-transitory computer storage readable medium of claim 7, comprising further stored instructions, that when executed by the processor, causes the processor to execute a command line interface instruction to cause the container service to output manifest data for the application container.

10. A computer-implemented method in a container system, comprising:

detecting that an application container has been added in the container system, the application container having computer-readable instructions, the application container initiated via a container service and isolated using operating system-level virtualization;

opening a stored manifest for the application container, the stored manifest comprising configuration settings for the newly added application container;

retrieving running services information regarding the application container, the running services information including information provided by the container service about the application container running on the container system, wherein retrieving the running services information regarding the application container further comprises executing a command line interface instruction to cause the container service to request a list of service descriptors for a namespace comprising the application container;

generating a security policy for the application container, the security policy defining a set of actions for which the application container can perform, the set of actions determined using the manifest and the running service information associated with the application container;

loading the security policy at a security container, the security container configured to, upon loading the security policy, block an action performed by the application container in response to determining that the action performed by the application container does not match any action in the set of actions defined in the security policy for the application container; and transmitting the security policy to a graphical user interface container for presentation to a user via a display device, the graphical user interface container presenting information about the generated security policy.

11. The method of claim 10, wherein the running services information indicates a network connection between the application container and another application container within the namespace.

12. The method of claim 10, wherein generating a security policy for the application container further comprises generating one or more network rules which allow the application container to make one or more network connections indicated in at least one of the manifest and the running service information associated with the application container.

13. A computer container system comprising:
- one or more application containers, each application container including computer-readable instructions and initiated via a container service and isolated using operating system-level virtualization;
- a computing device comprising memory and a processor, the memory configured to store code instructions, the code instructions, when executed by the processor, cause the processor to:
  - detect that an application container of the one or more application containers has been added in the container system;
  - open a stored manifest for the application container, the stored manifest comprising configuration settings for the newly added application container;
  - retrieve running services information regarding the application container, the running services information including information provided by the container service about the application container running on the container system, wherein the instruction to retrieve the running services information regarding the application container further comprises an instruction to execute a command line interface instruction to cause the container service to request a list of service descriptors for a namespace comprising the application container; and
  - generate a security policy for the application container, the security policy defining a set of actions for which the application container can perform, the set of actions determined using the manifest and the running service information associated with the application container;
- a security container operating to load the security policy, the security container configured to block an action performed by the application container in response to determining that the action performed by the application container does not match any action in the set of actions defined in the security policy for the application container; and
- a graphical user interface container operating to present information about the generated security policy to a user via a display device.

14. The container system of claim 13, wherein the running services information indicates a network connection between the application container and another application container within the namespace.

15. The container system of claim 13, wherein the instruction to generate the security policy for the application container further comprises an instruction generate one or more network rules which allow the application container to make one or more network connections indicated in at least one of the manifest and the running service information associated with the application container.

16. A non-transitory computer storage readable medium comprising stored instructions, the instructions when executed by a processor, causes the processor to:
- detect that an application container has been added in the container system, the application container including computer-readable instructions, the application container able to be initiated via a container service and isolated using operating system-level virtualization;
- open a stored manifest for the application container, the manifest comprising configuration settings for the newly added application container;
- retrieve running services information regarding the application container, the running services information including information provided by the container service about the application container running on the container system, wherein the instruction to retrieve the running services information regarding the application container further comprises an instruction to execute a command line interface instruction to cause the container service to request a list of service descriptors for a namespace comprising the application container; and
- generate a security policy for the application container, the security policy defining a set of actions for which the application container can perform, the set of actions determined using the manifest and the running service information associated with the application container;
- load the security policy at a security container, the security container configured to, upon loading the security policy, block an action performed by the application container in response to determining that the action performed by the application container does not match any action in the set of actions defined in the security policy for the application container; and
- transmit the security policy to a graphical user interface container for presentation to a user via a display device, the graphical user interface container presenting information about the generated security policy.

17. The non-transitory computer storage readable medium of claim 16, wherein the running services information indicates a network connection between the application container and another application container within the namespace.

18. The non-transitory computer storage readable medium of claim 16, wherein the instruction to generate the security policy for the application container further comprises an instruction generate one or more network rules which allow the application container to make one or more network connections indicated in at least one of the manifest and the running service information associated with the application container.

* * * * *